Aug. 1, 1950 K. E. BEMIS 2,517,167
MEANS FOR AUTOMATIC FRYING AND BASTING OF EGGS
Filed May 29, 1946 2 Sheets-Sheet 1
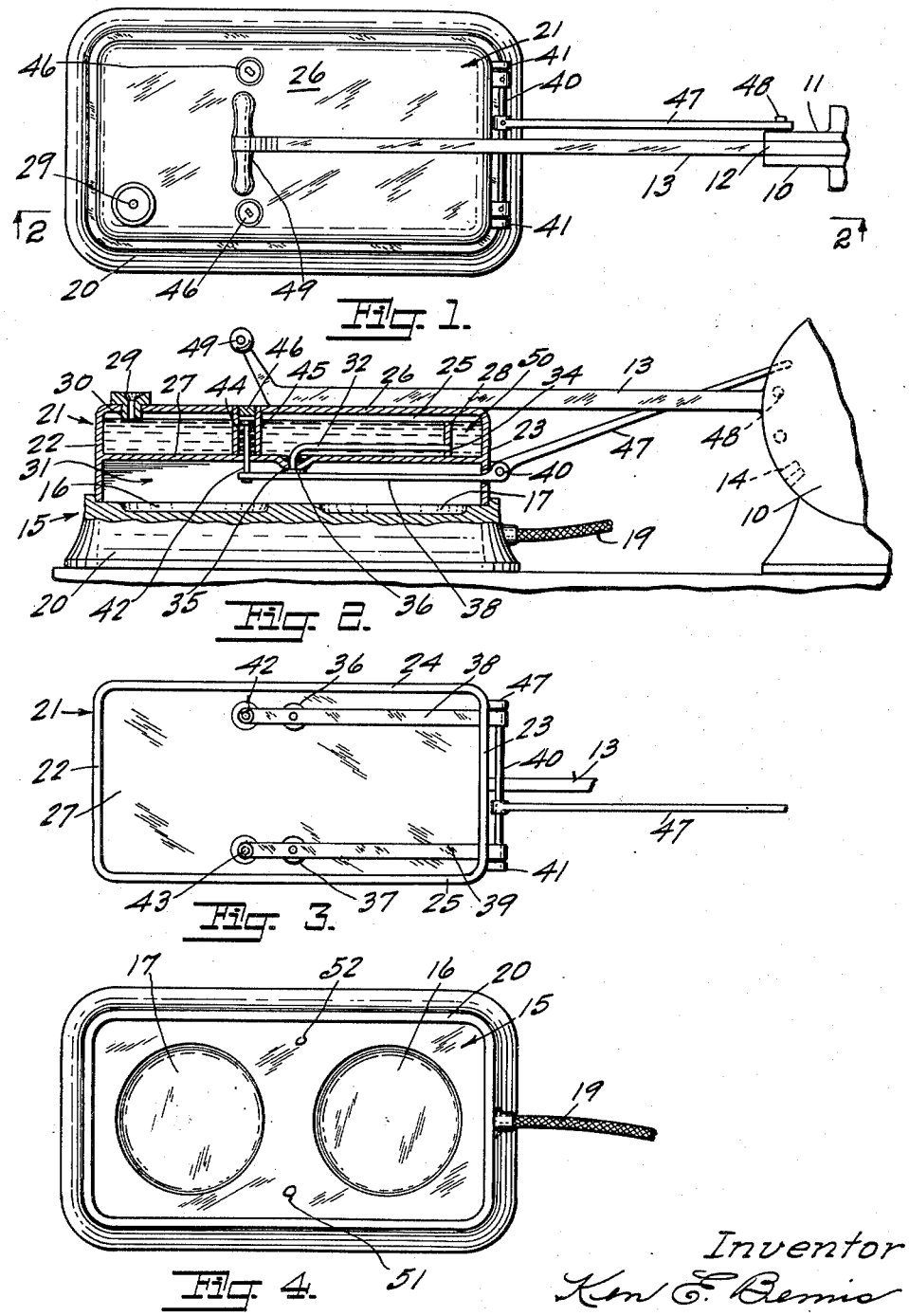
Inventor
Ken E. Bemis
By Philip A. Friedell
Attorney.

Aug. 1, 1950 — K. E. BEMIS — 2,517,167
MEANS FOR AUTOMATIC FRYING AND BASTING OF EGGS
Filed May 29, 1946 — 2 Sheets-Sheet 2

Inventor
Ken E. Bemis
By Philip R. Friedell
Attorney

Patented Aug. 1, 1950

2,517,167

UNITED STATES PATENT OFFICE 2,517,167

MEANS FOR AUTOMATIC FRYING AND BASTING OF EGGS

Ken E. Bemis, Oakland, Calif.

Application May 29, 1946, Serial No. 673,051

11 Claims. (Cl. 99—330)

This invention provides a new and improved means for frying eggs in that it involves a timed and measured basting step, with basting initiated following a predetermined time-elapse period of frying and with a measured amount of water through a second predetermined time-elapse period, with combined frying and steaming continuing for a third measured time period, thus resulting in the most rapid and uniform cooking of the eggs with the eggs actually fried and steamed instead of being merely steamed as occurs with conventional processes which involved basting or steaming. Furthermore the eggs are heated and suitably cooked clear through without actual congelation of the yolks and without crisping of the whites, and the eggs are therefore more delectable in appearance and flavor, devoid of unheated totally uncooked yolk or white portions.

This process provides what may be considered as a combination of fried and poached egg. In certain egg cooking processes the eggs are fried until nearly done and are then covered to steam the top surfaces resulting in a product in which the yolks are still raw in the central portion and usually with the whites crisped on the bottom to an inedible stage because of the extended time of frying.

With my process the griddle is maintained at a proper temperature for frying, at a temperature to complete the operation in a predetermined period of time preferably about 75 seconds. When the eggs are broken into the griddle it causes a cooling effect on the griddle, considerably lowering the temperature. If basting was started immediately there would be no frying operation but simply a sort of poaching operation. However, in my process the griddle is given suitable time to restore its normal frying temperature and frying is then continued for a predetermined period, about 60% of the total time-elapse period, to attain the most delectable degree of congelation of the whites, this time-elapse period being preferably about 45 seconds and only then is a measured quantity of warm water introduced and then only on areas of the griddle not occupied by the eggs and only through a predetermined period of time, preferably 5 seconds, or about 7% of the total time-elapse period. This again drops the temperature of the griddle and the water changes into steam which is trapped in a hood over the eggs and which steam envelopes and cooks the tops of the eggs and heats the eggs downward from the top surfaces while the griddle gradually regains its normal frying temperature and continues the frying on the bottom of the eggs, with the entire operation terminated and the hood raised to permit the steam to escape at a measured time interval, preferably 75 seconds following introduction of the eggs into the griddle recesses. Best results are obtained when the griddle is heated to a proper temperature for the above time-elapse periods, though satisfactory results are obtainable within 15% of these periods if the griddle is heated to suit the decreased or extended times.

With this method, because of the specific timing and measure of water introduction, and the measured combined frying and steaming period, the eggs increase considerably in volume and are light and tasty, with the whites on the surface congealed to just sufficient degree to provide a serving of eggs which is appetizing and of delicious flavor.

The objects and advantages of the invention are as follows:

First, to provide an egg cooker which is automatically timed for initial frying period, initiation and time interval of basting and the amount of water admitted for basting, and for final combined frying and steaming period.

Second, to provide an egg cooker with automatic control of the volume of water introduced for basting.

Third, to provide an egg cooker with time control for timing the entire period and the sequential steps in the cooking process.

Fourth, to provide an egg cooker which will initially fry the eggs for a predetermined period of time and then change to combined frying and steaming for a second measured period of time for thorough heating of the eggs.

Fifth, to provide an egg cooker with a supply of water for basting and with means for measuring a predetermined volume of water under a predetermined head irrespective of the remaining volume or head of the supply, for basting the eggs.

Sixth, to provide an egg cooker with timed control means and automatic volume and head measuring means for introducing a predetermined volume of water under a predetermined head within a predetermined period of time, and following a predetermined time-elapse period after starting frying of the eggs, for basting the eggs, and subsequently terminating cooking of the eggs and freeing the steam generated at the completion of a total time-elapse period.

Seventh, to provide an egg cooker as outlined which is simple in construction and arrangement, entirely automatic in operation (with the exception of introduction of the eggs and initiation of the series of operations), constructed of a minimum number of parts, and operated and controlled by timing means which is non-adjustable for maintenance of a uniform product.

In describing the invention reference will be made to the accompanying drawings, in which:

Fig. 1 is a top plan view of my invention showing its connection to a timing and actuating device.

Fig. 2 is a sectional elevation through the invention and corresponds to a section taken on line 2—2 of Fig. 1.

Fig. 3 is a bottom plan view of the invention with the griddle removed.

Fig. 4 is a top plan view of the griddle.

Figure 5:
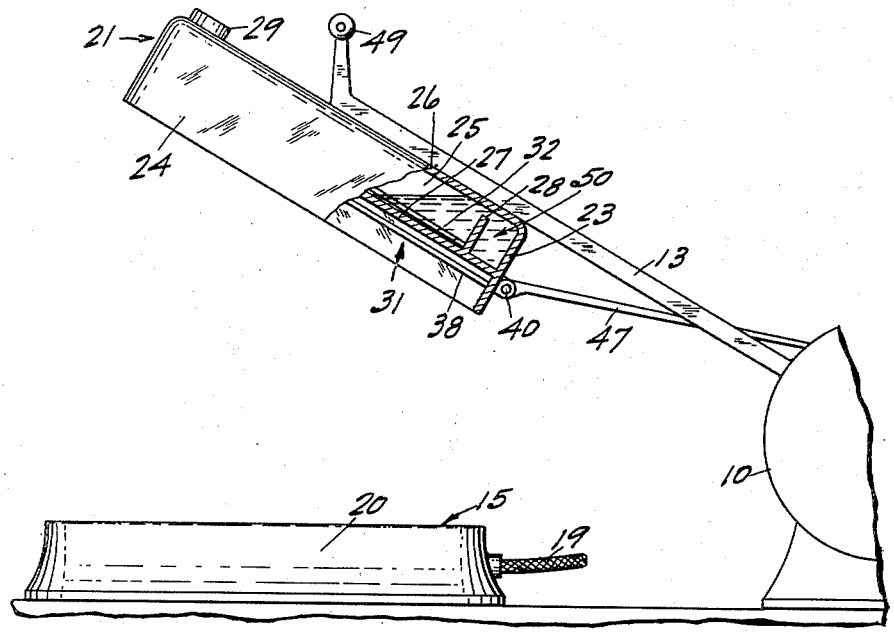
Fig. 5 is a side elevation of the invention in open position and ready for operation.

This invention is preferably used in connection with the combined timer and actuating means disclosed in my copending application Serial Number 651,393, filed March 1, 1946, and which application has resulted in Patent No. 2,430,444, with modifications to suit the specific operations and time sequences required. This combined timer and actuating means, as is fully disclosed in the copending application, consists of a constantly rotating shaft and clutch member and a stationary disc 10 and a rotatable disc 11 which cooperate with an actuating member 12 which carried an arm 13 for actuating a device, depression of the arm as indicated in Fig. 2 causing the constantly rotating clutch to engage the rotatable disc and carry it along with the shaft until certain engageable elements 14 on the discs cooperate to first lift the arm 13 and then disengage the clutch. The time interval is fixed, as there is no way of adjusting the timer. The timer is arranged to complete an operation in one-half, one-third, or one-fourth of a revolution of the shaft and is arranged in accordance with the specific time cycle required, which in the present case is found to give best results at 75 seconds for the complete cycle so that with one pair of engaging elements 14 on each disc, the shaft would be driven continuously at a speed of one revolution in two and one-half minutes with the timer operating through a cycle of one and one-quarter minutes, and therefore the invention is always ready for instant operation and can only operate through the specific time period for which the timer is constructed and the speed at which the shaft is driven.

The invention includes a griddle 15 which is provided with depressions 16 and 17 each normally made of a size suitable for two de-shelled eggs 18, and this griddle is provided with suitable heating means and temperature control means of conventional types, and indicated as being electrically heated with current supplied through the cable 19, the heating elements and thermal controls (not shown) being housed within the base portion 20 of the griddle.

The principal part of the invention exists in the combination steam dome, water container, water measuring and head stabilizing means, and control valve and actuating means therefor, and which consists of a housing 21 having front and back walls 22 and 23, side walls 24 and 25, a top wall 26 to which is suitably attached the actuating arm 13, a horizontal partition 27 intermediate the height and coincidently forming the bottom of the water container and the top of the steam dome, and an apportioning and head standardizing chamber formed by a vertical partition 28 near the rear wall and extending almost to the top wall 26 and forming the water measuring and head stabilizing control, the compartment formed by this partition having a volume preferably equal to the amount of water to be introduced with each egg frying operation.

A filler vent 29 is provided at the forward end of the water compartment and extends down into the compartment to a level slightly below the level of the top of the partition 28 as indicated at 30 so that the container cannot be filled to a level higher than the top of the partition and thus increase the head for dispensing water.

The space 31 below the bottom 27 of the water reservoir comprises the steam hood and the surrounding walls bear directly on the surface of the griddle as indicated in Fig. 2, during a frying operation.

The water dispensing means consists of two tubes, 32 and 33 one for each side of the container, and which have communication with the apportioning compartment as indicated at 34 and open through the bottom of the container as indicated at 35 and which are closed by resilient valves 36 and 37 which are carried by the arms 38 and 39 the rearward ends of which extend through the rear wall and are fixed on a transverse shaft 40 which is suitably rotatably supported by the hood as indicated at 41, the forward ends being drawn up to normally close the valves by plungers 42 and 43 which in turn are urged upward by springs 44 enclosed in housings 45 passing through the water compartment and sealed therein and with the upper ends closed by removable plugs 46.

An actuating lever 47 is fixed at one end on the shaft 40 and extends rearwardly to a point slightly within the peripheral edge of the rotatable disc 11 for cooperation with an engaging element such as a pin 48 specially provided on the timing device. The actuating arm 13 is attached to the top of the hood as indicated in Figs. 2 and 5.

To place the invention in service, the hood is depressed by means of the handle 49 to the position shown in Figs. 1 and 2, the tank 25 is filled with water through the vent 29 and the timer set in operation. The griddle is arranged to heat to and maintain a predetermined temperature, being thermostatically controlled by conventional means.

When the engaging element 48 on the timer reaches the lever 47, it will open the valves 36 and 37, but since the container cannot be filled sufficiently to overflow the partition 28 because of the depending filler vent 30, and being the initial filling of the container no water will be released, and as the engaging members 14 come into engagement with the arm 13, and with it the hood will be raised to the position indicated in Fig. 5, and when this position is reached, the hood is supported in that position ready for the first operation, this raising of the hood causing the water in the container to overflow the partition 28 and fill the apportioning and head maintaining compartment 50, and this will occur each time the hood is raised, so long as any water is left in the container, as shown in Fig. 5. The volume of the compartment or the distance of the wall 28 from the rear wall of the hood is exaggerated for purposes of clarity.

The eggs are broken into a dish, the griddle recesses or depressions 16 and 17 are buttered, the eggs poured into the recesses where they are limited to spread by the peripheral wall of the recesses to form circular servings. The handle 49 is depressed bringing the hood down into contact with the top of the griddle, which simultaneously disengages the engaged members 14 and thus causing clutching of the disc 11 which starts rotation of the disc with the continuously driven shaft of the timer, the operation of which is completely explained in my copending application previously mentioned.

Figure 6:
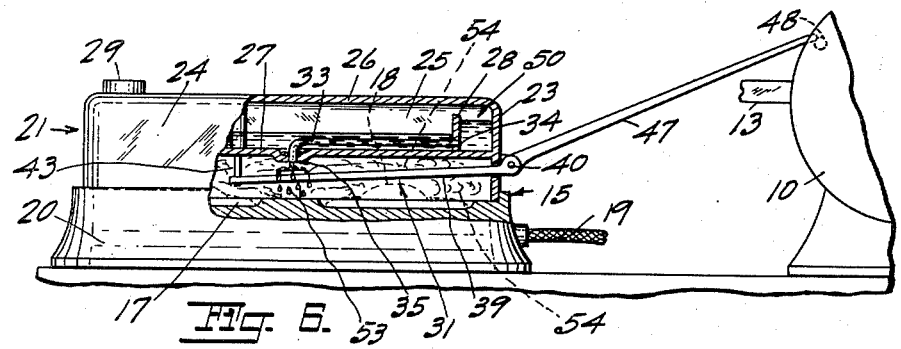
Fig. 6 is a side elevation of the invention shown partly in section to illustrate the basting control means.
Figure 7:
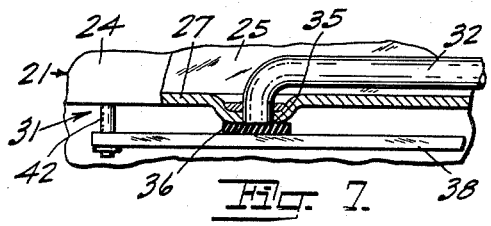
Fig. 7 is an enlarged fragmentary view showing the bottom of the water container in section and the tube connection to the water apportioner and the valve for control of the same.

The eggs initially cause a drop in temperature of the griddle and which temperature is quite rapidly restored. The eggs start frying and continue to fry until the pin 48 on disc 11 engages the control lever 47 and raises the end, which through the shaft 40 and levers 38 and 39 opens the valves 36 and 37 allowing the water in the compartment 50 to flow through the tubes 32 and 33 onto the surfaces 51 and 52 on the respective sides and between the two recesses as indicated at 53 in Fig. 6, until the pin 48 passes the end and releases the lever 47, freeing the levers 38 and 39 to be snapped back into position to close the valves by the springs 44, thus terminating admission of water within a specific time interval irrespective of whether the water has completely drained from the compartment 50 or not, so as to maintain an exact time-elapse sequence for the respective operations and for the entire process.

The water, though warmed in the hood compartment, causes a second cooling effect on the griddle but the griddle changes the water into steam as indicated at 54 which fills the hood and envelopes the tops of the eggs, while in the meantime the griddle again regains its normal temperature and continues the frying operation, and after a further time-elapse period, the engaging elements 14 on the timer again become engaged, raising the arm 13 and with it the hood, to the position shown in Fig. 5, thus completing the operation with the eggs perfectly fried and basted, with the entire egg heated clear through, the egg considerably expanded and therefore light and tender, and with the covering whites suitably cooked to a translucent stage where the yolks show through but properly cooked without undue congelation, resulting in a highly digestible and appetizing serving of eggs.

As will be readily apparent from the drawings, the timer serves as a hinge for the hood, and this invention can readily be arranged for manual timing and operation by hinging the rear lower edge of the hood to the base as is conventionally done with waffle irons and the like, and manually operating the trip lever 47, which can be arranged to operate in the most convenient position with the hood manually lowered, timed, the lever 47 depressed for a few seconds after a predetermined time interval and released, and the hood raised after another time interval, and which would be well suited to ordinary household use. The container can be refilled at any time as required during a frying operation when the hood is lowered.

A resilient valve proved most satisfactory, since metal valves of the mushroom or ball type tended to gum up, while the resilient type could be used through long periods without cleaning or replacement. The method of closing the valve assures complete closure because of the increased leverage transmitted through the connections 42 and 43 by the springs 44.

I claim:

1. An egg cooker comprising a griddle having a base, and a timer supported by said base; a hood hingedly connected to said timer and adapted to rest on the surface of the griddle to form an enclosure thereover; a water container within said hood and measuring means communicable with said water container for measuring a predetermined quantity of water from said container through raising and lowering of the hood, and dispensing means for said measuring means and operable by said timer for introducing the measured quantity of water to said griddle following a predetermined time-elapse period after the hood is lowered, to form a body of steam within the enclosure.

2. An egg cooker in combination; a griddle; a hood to form an enclosure over the griddle when in lowered position and movable to a raised position and a hinged support for said hood; a water container associated with said hood and including measuring means communicable with said water container for measuring a predetermined quantity of water when the hood is raised and establishing a standard quantity under a standard head when the hood is lowered to rest on the griddle and an outlet for said measuring means, and dispensing means for said measuring means and including a valve and control means therefore for said outlet for discharging said standard quantity to said griddle through said outlet when the hood is in its lowered position.

3. A structure as defined in claim 2; said hood having top, front, rear, and side walls and a horizontal partition intermediate the height of the hood to divide the hood into a lower hood portion to form an enclosure over the griddle and an upper water container portion forming said water container, and having a chamber formed at the rear end adjacent the rear wall and extending substantially to the top wall and having a water passage at the top with the water passage functioning as the head and quantity standardizing means, and including said outlet and valve and valve control means from the lower end of the chamber to discharge to a predetermined point on the griddle within the confines of the hood.

4. A structure as defined in claim 2; timing means; said control means comprising a lever arm having said valve to close said outlet and spring urging means therefor for normally closing said outlet, said lever arm having an operative connection exteriorly of the hood with said timing means for actuating said lever arm to open said outlet following a predetermined time-elapse period after the hood has been lowered.

5. A culinary device, in combination; a support; a griddle mounted on said support; a hood hingedly supported by said support and movable to a raised position, and depressable to a lowered position in contact with the griddle to form an enclosure thereover; a container for water formed in said hood and including an apportioning and head standardizing compartment for measuring a predetermined quantity of water and establishing a predetermined head therefor with each raising and depressing movement of the hood, and dispensing means including outlets from said compartment and valve means and control means therefor for dispensing said measured quantity of water from said compartment to predetermined areas of said griddle within the confines of said hood to form an envelope of steam within the hood over the top surface of food being cooked on the griddle.

6. A structure as defined in claim 5; said hood comprising top, front, rear, and side walls, and an intermediate horizontal wall coincidently functioning as the top wall of the enclosure and the bottom of said container for water, said compartment being formed adjacent the rear wall and extending substantially to the top of the container and having a passage for water at the upper end for filling from the container when the hood is raised and for establishing the predetermined head when the hood is lowered, and a filler vent for said container and located at the forward end of the hood.

7. A structure as defined in claim 5; timing means supported by said support and hingedly supporting said hood; said timing means being made actuable through manual depression of said hood to rest on said griddle; said timing means raising said hood following a predetermined total time-elapse period and having a timing element operatively related to said control means for actuation thereof for dispensing said measured quantity of water following an initial time-elapse period after manual depression of said hood, and releasing said control means to terminate dispensing of water and close the outlets at the termination of an intermediate time-elapse period.

8. A structure as defined in claim 5; said hood comprising top, front, rear, and side walls, and an intermediate horizontal wall coincidently functioning as the top wall of the enclosure and the bottom of said container for water, said apportioning and head standardizing means comprising said compartment formed adjacent the rear wall and extending substantially to the top of the container and having a passage for water at the upper end for filling from the container when the hood is raised and for establishing the predetermined head when the hood is lowered, and a filler vent for said container and located at the forward end of the hood; timing means supported by said support and having pivotal connection with said hood to form said hinged support with said hood manually depressable and said timing means made actuable through manual depression of said hood; said timing means raising said hood following a predetermined total time-elapse period and having a timing element operatively related to said control means for actuation thereof for dispensing said measured quantity of water following an initial time-elapse period after manual depression of said hood, and releasing said control means to terminate dispensing of water and close the outlets at the termination of an intermediate time-elapse period.

9. A culinary device, in combination; a griddle; continuously driven timing means; a hood hingedly connected with said timing means and normally maintained thereby in a raised position and manually depressable at will to contact the surface of the griddle to form an enclosure for steam thereover and including a container for water formed in said hood and having a compartment formed therein for apportioning the water and standardizing the head thereof through raising and lowering movements of the hood, said means including dispensing means and control means therefor controlled by said timing means for discharging the measured quantity of water to predetermined areas of said griddle at a predetermined time in a cooking cycle with said hood movable to a raised position by said timing means at the completion of a cycle.

10. A structure as defined in claim 9; said hood comprising top, front, rear, and side walls, and an intermediate horizontal wall coincidently functioning as the top wall of the enclosure and the bottom of said container for water, said apportioning and head standardizing means comprising said compartment formed adjacent the rear wall and extending substantially to the top of the container and having a passage for water at the upper end for filling from the container when the hood is raised and for establishing the predetermined head when the hood is lowered, and a filler vent for said container and located at the forward end of the hood.

11. A culinary device comprising; a griddle and heating means and a support therefor; a hood hingedly coupled to said support and cooperatively related to said griddle and having top, front, rear, and side walls, and a horizontal partition intermediate the height to divide the hood into a lower steam enclosing compartment in combination with said griddle, and an upper container for water having a filler vent at the forward end and internally having an apportioning and head standardizing chamber located in the rearward portion and extending substantially to the top wall with an intervening passage for water for filling and head establishing, tubular connections having outlets opening through said partition and in communication with the lower portion of said chamber; a valve for each outlet; a valve actuating arm for each valve and means for normally urging said arms to close said valves; and control means for simultaneously actuating said arms to open said valves at will to discharge the water contained in said chamber to predetermined areas of said griddle when the hood is in a lowered position, said chamber being filled with water when the hood is raised and leveled to the established head when the hood is lowered.

KEN E. BEMIS.

REFERENCES CITED

The following references are of record in the file of this patent:

UNITED STATES PATENTS

| Number | Name | Date |
|---|---|---|
| 690,574 | Herbs | Jan. 7, 1902 |
| 1,434,792 | Neitro | Nov. 7, 1922 |
| 1,460,486 | Harvey | July 3, 1923 |
| 1,702,854 | Simonds | Feb. 19, 1929 |
| 1,741,791 | Reck | Dec. 31, 1929 |
| 1,865,973 | Shields | July 5, 1932 |
| 1,955,289 | Greenfield | Apr. 17, 1934 |
| 2,097,793 | Howell | Nov. 2, 1937 |
| 2,132,609 | Ellinger | Oct. 11, 1938 |